Figure 1:
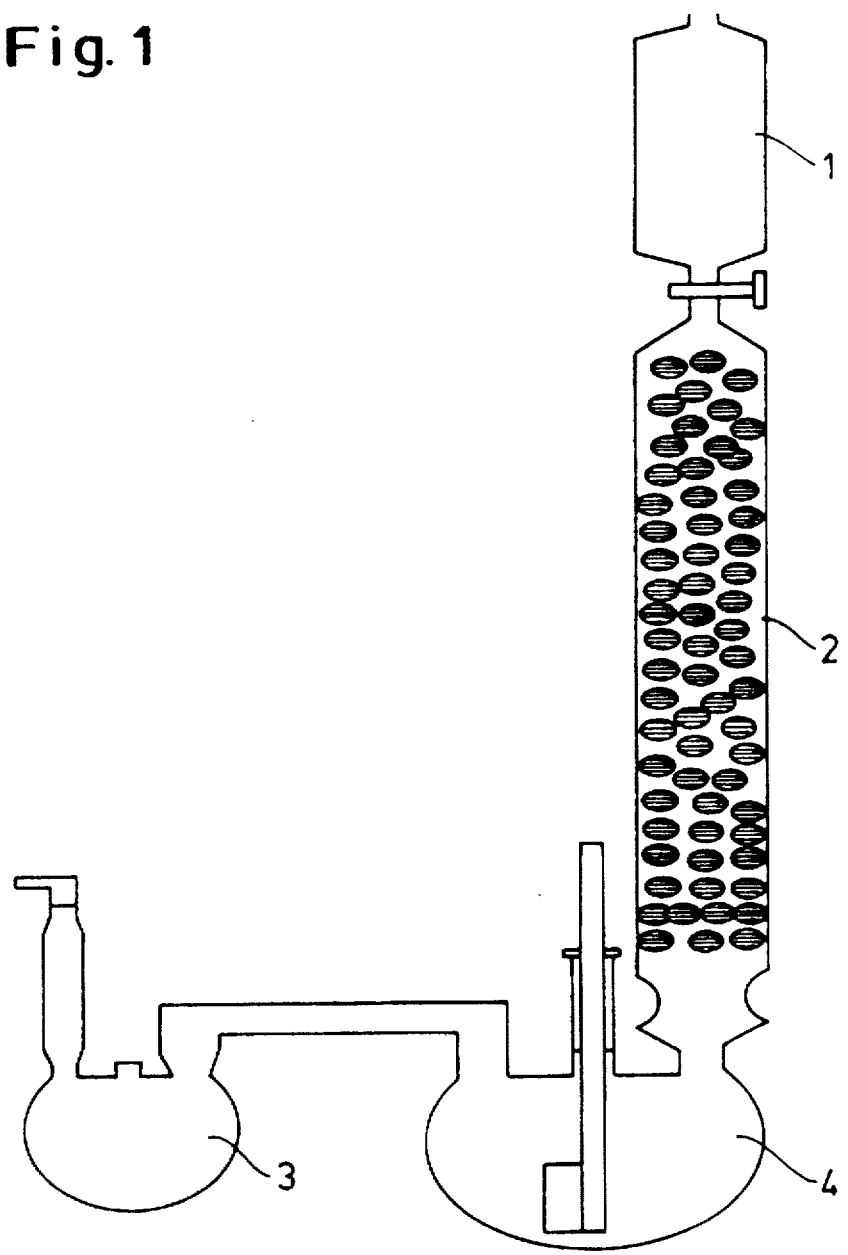

United States Patent [19]
Kühling et al.

[11] Patent Number: 5,756,641
[45] Date of Patent: May 26, 1998

[54] PROCESS FOR PRODUCING THERMOPLASTIC POLYCARBONATE

[75] Inventors: Steffen Kühling, Meerbusch; Gottfried Zaby, Leverkusen; Uwe Hucks, Alpen; Thomas Fischer, Krefeld, all of Germany

[73] Assignee: Bayer Aktiengesellschaft, Germany

[21] Appl. No.: 618,594

[22] Filed: Mar. 20, 1996

[30] Foreign Application Priority Data

Mar. 29, 1995 [DE] Germany .................. 195 11 467.1

[51] Int. Cl.⁶ .................................................... C08G 64/00
[52] U.S. Cl. ...................... 528/199; 502/100; 502/200; 502/232; 528/196; 528/198; 528/200
[58] Field of Search ....................... 502/100, 200, 502/232; 528/196, 198, 199, 200

[56] References Cited

U.S. PATENT DOCUMENTS

| | | | |
|---|---|---|---|
| 4,371,691 | 2/1983 | Friedhofen et al. | 528/196 |
| 5,300,685 | 4/1994 | Scates et al. | 562/608 |
| 5,478,961 | 12/1995 | Ooms et al. | 558/270 |

FOREIGN PATENT DOCUMENTS 0 031 512  12/1955  Germany .

*Primary Examiner*—Terressa Mosley
*Attorney, Agent, or Firm*—Connolly & Hutz

[57] ABSTRACT

The present invention relates to a transesterification process for producing thermoplastic polycarbonates with the use of fixed bed catalysts.

7 Claims, 1 Drawing Sheet

PROCESS FOR PRODUCING THERMOPLASTIC POLYCARBONATE

The present invention relates to a transesterification process for the production of thermoplastic polycarbonate, starting from aromatic diphenols, carboxylic acid diaryl esters and optionally branching agents and/or monophenols, with the use of catalysts at temperatures between 80° C. and 400° C. and pressures from 1000 mbar to 0.01 mbar, which is characterised in that fixed bed catalysts are used as catalysts.

The polycarbonates produced by the process according to the invention are solvent-free, are furnished with a light self-colour, and are substantially free from unwanted flaws in the polycarbonate.

The production of aromatic oligo/polycarbonates by the melt transesterification process is known from the literature and has been described previously, for example, in Chemistry and Physics of Polycarbonates, Polymer Reviews, H. Schnell, Vol. 9, John Wiley and Sons, Inc. (1964) and in DP-1 031 512.

In the aforementioned literature references and in the bibliographical references cited therein, homogeneously acting, basic alkali metal, alkaline earth metal and transition metal hydroxides, alcoholates, carbonates, acetates, borohydrides, hydrogen phosphates and hydrides are described as catalysts.

It has now been found that the transesterification of aromatic diphenols with carboxylic acid diaryl esters can be conducted over fixed bed catalysts.

Suitable diphenols for the process according to the invention are those of formula (I)

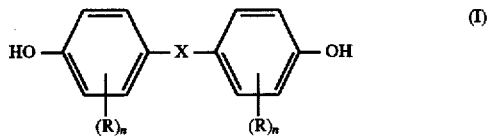

where
X=a $C_1$–$C_8$ alkylidene or cycloalkylidene, S, or a single bond,
R=$CH_3$, Cl or Br, and
n=zero, 1 or 2.

Examples of preferred diphenols are:
4,4'-dihydroxydiphenyl,
4,4'-dihydroxydiphenyl sulphide,
2,2-bis-(4-hydroxyphenyl)-propane,
2,2-bis-(3,5-dimethyl-4-hydroxyphenyl)-propane,
2,2-bis-(3,5-dichloro-4-hydroxyphenyl)-propane,
2,2-bis-(3,5-dibromo-4-hydroxyphenyl)-propane,
1,1-bis-(4-hydroxyphenyl)-cyclohexane and
1,1-bis-(4-hydroxyphenyl)-3,3,5-trimethylcyclohexane.

Diphenols which are particularly preferred from those cited above are 2,2-bis-(4- hydroxyphenyl)-propane and 1,1-bis-(4-hydroxyphenyl)-3,3,5-trimethylcyclohexane.

The aforementioned diphenols can be used for the production of homopolymers or copolymers.

The polycarbonates can be branched in a deliberate and controlled manner by the use of small amounts of branching agents. Some suitable branching agents are:
phloroglucinol,
4,6-dimethyl-2,4,6-tri-(4-hydroxyphenyl)-heptene-2,
4,6-dimethyl-2,4,6-tri-(4-hydroxyphenyl)-heptane,
1,3,5-tri-(4-hydroxyphenyl)-benzene,
1,1,1-tri-(4-hydroxyphenyl)-ethane,
tri-(4-hydroxyphenyl)-phenylmethane,
2,2-bis-[4,4-bis-(4-hydroxyphenyl)-cyclohexyl]-propane,
2,4-bis-(4-hydroxyphenyl-isopropyl)-phenol,
2,6-bis-(2-hydroxy-5'-methyl-benzyl)-4-methylphenol,
2-(4-hydroxyphenyl)-2-(2,4-dihydroxyphenyl)-propane,
hexa-(4-(4-hydroxyphenyl-isopropyl)-phenyl)-orthoterephthalate,
tetra-(4-hydroxyphenyl)-methane,
tetra-(4-(4-hydroxyphenyl-isopropyl)-phenoxy)-methane,
1,4-bis-(4',4''-dihydroxytriphenyl)-methyl)-benzene, and
particularly
$\alpha,\alpha',\alpha''$-tris-(4-hydroxyphenyl)-1,3,5-triisopropylbenzene.

Other possible branching agents are 2,4-dihydroxybenzoic acid, trimesic acid, cyanuric chloride and 3,3 bis-(3-methyl-4-hydroxyphenyl)-2-oxo-2,3-dihydroindole.

The 0.05 to 2 mole %, with respect to the diphenols used, of branching agents which may optionally be used, can be used together with diphenols.

Carboxylic acid diesters in the sense of the present invention are di-$C_6$-$C_{20}$-aryl esters, preferably the diesters of phenol or of alkyl-substituted phenols, namely diphenyl carbonate or dicresyl carbonate, for example. The carboxylic acid diesters are used in amounts of 1.01 to 1.30 moles, preferably 1.02 to 1.15 moles, with respect to 1 mole of bisphenol.

It must be ensured that the reaction components, namely the diphenols and the carboxylic acid diesters, are free from alkali metal and alkaline earth metal cations, wherein amounts of alkali metal and alkaline earth metal cations less than 0.1 ppm can be tolerated. Pure diphenols and diphenols of this type can be obtained by recrystallisation, washing and/or distillation of the carboxylic acid diaryl esters or diphenols. In the process according to the invention, the content of alkali metal and alkaline earth metal cations, both in the diphenol and in the carboxylic acid diester, should have a value <0.1 ppm. The total content of chlorine in the raw materials should not exceed a value of 2 ppm, and the content of saponifiable chlorine in the carboxylic acid diester should not exceed a value of 0.05 ppm. When distillation is used for purifying the raw materials in the final stage of their production, it is advantageous for the colour of the resulting polycarbonate if the raw materials, namely the diesters and the carboxylic acid diaryl esters, have not passed through the solid phase, and therefore a liquefied material or a mixed liquefied material of the raw materials is fed into the transesterification reaction or at least one of the raw materials is metered in as a liquid.

Fixed bed catalysts in the sense of the process according to the invention are zeolites and polymeric, thermally stable, heterogeneous catalysts.

The zeolites to be used according to the invention are known as such from the literature; see Kirk-Othmer "Encyclopedia of Chemical Technology" 2nd Ed. 1964, Vol. 5, pages 541–561, for example.

Examples of substances which can be used according to the invention, classified as in the aforementioned article, include: types of kaolin such as kaolinite, dickerite and nacrite (all $Al_2O_3 \times 2SiO_2 \times 2 H_2O$) or anauxite ($Al_2O_3 \times 3SiO_2 \times 2H_2O$) or halloysite ($Al_2O_3 \times 2SiO_2 \times 2H_2O$) or endellite ($Al_2O_3 \times 2SiO_2 \times 4H_2O$), as well as types of spinel produced by heating types of kaolin, further, types of serpentine (($Mg_2Al)(SiAl)O_5(OH)_4$), in which 3 Mg ions have replaced 2 Al ions in types of kaolin. Types of serpentine also comprise amesite(($Mg_2Al)(SiAl)O_5(OH)_4$) and cronstedtite ($Fe_2^{2+}Fe^{3+}$) ($SiFe^{3+})O_5(OH)_4$, as well as chamosite ($Fe^{2+}$, $Mg)_{2.3}$ $(Fe^{3+}Al)_{0.7}(Si_{1.14}Al_{0.86})O_5(OH)_4$, and also the nickel or cobalt species which can currently also be obtained synthetically.

In addition, aluminosilicates of the montmorillonite type can be used, such as the following, for example:

montmorillonite $[Al_{1.67}Mg_{0.33}(Na_{0.33})]Si_4O_{10}(OH)_2$
beidellite $Al_{2.17}[Al_{0.33}(Na_{0.33})]Si_{3.17}O_{10}(OH)_2$
nontronite $Fe^{3+}[Al_{0.33}(Na_{0.33})]Si_{3.67}O_{10}(OH)_2$
hectorite $[Mg_{2.67}Li_{0.33}(Na_{0.33})]Si_4O_{10}(OH,F)_2$
saponite $Mg_{3.0}|Al_{0.33}(Na_{0.33})]Si_{3.67}O_{10}(OH)_2$
sauconite $[Zn_{1.48}Mg_{0.14}Al_{0.74}Fe^{3+}][Al_{0.99}Si_{3.01}]O_{10}(OH)_2$ $X_{0.33}$ as well as types containing $Cu^{2+}$, $Co^{2+}$ or $Ni^{2+}$ (X=halogen), such as volkoskoite, medmontite or pimelite.

Argillaceous earths of this type may be used on their own or as a mixture of two or more argillaceous earths, and may contain the impurities which are customary in these natural products, such as those which are customary in bentonite (=montmorillonite with residues of feldspar, quartz, etc.).

Argillaceous earths which are described as "montmorillonite types" are preferred, and montmorillonite itself is particularly preferred. Aluminosilicates of the zeolite type are also preferred.

The zeolites to be used according to the invention are crystalline, hydrated aluminosilicates, which are synthesised or which occur naturally, and which possess a framework structure (see D. W.Breck in "Zeolite Molecular Sieves", Wiley Interscience, 1974, pages 133–180; Ullmanns Enzyklopädie der Technischen Chemie [*Ullmanns Encyclopedia of Industrial Chemistry*], 4th Edition, Volume 17 pages 9–18, Verlag Chemie, Weinheim, New York). Those corresponding to the following formula are preferred:

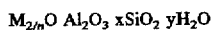

$M_{2/n}O \; Al_2O_3 \; xSiO_2 \; yH_2O$ where

M represents protons or metal cations of Groups Ia, IIa, IIIa, IVa, Va, VIa, VIIa, VIIIa, Ib, IIb, IIIb and IVb, preferably protons or metal cations of Groups Ia, IIa, IVa and IVb, most preferably $H^+$, $Na^+$, $K^+$, $Cs^+$, $Ca^+$, $Mg^{2+}$, $Zn^{2+}$, $La^{3+}$, $Pr^{3+}$ or $Ce^{3+}$, n represents the valency of the metal cation, x represents the $SiO_2/Al_2O_3$ molar ratio, where X can be a number from 1.0 to 50.0, preferably 2.0 to 25.0, and y represents a number comprising 0 or 1–9.

The following are suitable for the process according to the invention: zeolites of structure A and of the faujasite structure (Type X,U,Y), L, ZSM, mordenite, offretite, phillipsite and sodalite, and also zeolite-like materials such as AlPO's and SAPO's. Zeolites of structure A, of the faujasite structure (X, Y -type), L, mordenite, and offretite are particularly suitable, and zeolites of structure A, and of the faujasite structure (X and Y), and mordenite are quite particularly preferred.

The polymeric, thermally stable fixed bed catalysts according to the invention also include the polybenzimidazoles known from the literature (Polymer, 1992, Volume 33, No. 8, page 1773).

The catalysts are used in concentrations from $10^{-8}$ % by weight to 95% by weight, preferably from $10^{-6}$ % by weight to 80% by weight, with respect to the diphenol used.

The polycarbonate ethers are produced by reacting aromatic dihydroxy compounds and carboxylic acid diesters under the condensation polymerisation conditions which are customary according to the literature. For example, the conditions for the first step comprise the reaction of aromatic dihydroxy compounds and carboxylic acid diester at temperatures from 80° C. to 240° C., preferably 100° C. to 230° C., most preferably 120° C. to 200° C., under normal pressure for 0 to 5 hours, preferably 0.25 to 3 hours, over the catalyst according to the invention, to form the corresponding oligocarbonates. Thereafter, the temperature for completing the formation these oligocarbonates over the fixed bed catalysts according to the invention is between 100° C. and 290° C., preferably between 150° C. and 280° C. The monophenols produced during the transesterification to form oligocarbonate are removed by applying a vacuum of 1 bar to 0.5 bar, preferably <500 mbar to 1 mbar.

The oligocarbonates obtained in this manner have average molecular weights $M_w$ from 3000 to 24,000, preferably from 5000 to 20,000, as determined by measuring the relative solution viscosity in dichloromethane or in mixtures of equal amounts by weight of phenol and o-dichlorobenzene, calibrated by light-scattering. For the further condensation polymerisation of said oligocarbonate the fixed bed catalyst can be removed, for example by filtering it off and centrifuging. A stationary fixed bed catalyst past which the oligocarbonate flows is preferred.

In this subsequent condensation polymerisation step of the oligocarbonate, the polycarbonate is produced by increasing the temperature further to 230° C. to 400° C., preferably to 250° C. to 320° C., and at a pressure of <100 mbar to 0.01 mbar.

Provided that the fixed bed catalyst is no longer present in this condensation polymerisation step of the oligocarbonate, the polycarbonate can be produced by the addition of an alkali metal/alkaline earth metal catalyst to the oligocarbonate and by increasing the temperature further to 230° C. to 400° C., preferably to 250° C. to 320° C., and at a pressure of <100 mbar to 0.01 mbar.

The alkali metal/alkaline earth metal catalysts are preferably used in amounts of $10^{-8}$ to $10^{-4}$ moles with respect to 1 mole of diphenol, most preferably at a concentration of $10^{-7}$ to $10^{-5}$ moles. Lithium, sodium, potassium, caesium, calcium, barium or magnesium hydroxides, carbonates, halides, phenolates, diphenolates, fluorides, acetates, phosphates, hydrogen phosphates or borohydrides are used, for example. The conjoint use of alkali metal or alkaline earth metal catalysts does not run counter to the aforementioned requirement of purity of the reactants.

These alkali metal/alkaline earth metal catalysts may also be used in combination with each other (two or more).

The alkali metal/alkaline earth metal catalyst may be added either as a solid or as a solution in water, phenol, oligocarbonate or polycarbonate.

The final step, namely the condensation polymerisation, is preferably effected for short periods <1 hour, most preferably <30 minutes. High-viscosity reactors, simple plug reactors and high-viscosity plug reactors, kneaders or screw-type machines, namely a Z-blade kneader for example, are suitable for this purpose.

The aromatic polycarbonates of the process according to the invention should have average molecular weights $M_w$ from 18,000 to 60,000, preferably: from 19,000 to 40,000, as determined by measuring the relative solution viscosity in dichloromethane or in mixtures of equal amounts by weight of phenol and o-dichlorobenzene, calibrated by light-scattering.

This is achieved in that low molecular weight oligocarbonates are preferably subjected to condensation polymerisation to form low viscosity polycarbonates by distillation of monophenol, and higher molecular weight oligocarbonates are subjected to condensation polymerisation to form high viscosity polycarbonates.

In the sense of the process according to the invention, the reaction of the aromatic dihydroxy compound and the carboxylic acid diester over the fixed bed catalyst to be used according to the invention may be conducted continuously or batch-wise, preferably continuously, for example in stirred vessels/stirred vessel cascades or in tubular reactors by means of overflow over the fixed bed catalyst.

The terminal OH group content of the total groups contained in the polycarbonates obtainable according to the invention should be <30%, preferably <25%, more preferably <20%, and most preferably <10%.

The oligocarbonate which is obtainable as an intermediate product can also be isolated, e.g. it can be granulated and subsequently subjected to condensation polymerisation in a separate step.

The reaction of oligocarbonate to form polycarbonate can also be conducted according to WO 90/7536 or EP-A-338 085, by crystallising the oligocarbonate produced according to the invention and subjecting it to solid phase condensation polymerisation in the solid phase.

Molecular weight regulators, such as an alkyl phenol (isooctyl phenol, t-butyl phenol, cumyl phenol) for example, can be used in the requisite amounts in the known manner (EP-360 578) in order to limit the average molecular weights $\overline{M}_w$ of the polymers.

Auxiliary materials and reinforcing agents may be added to the polycarbonates produced according to the invention in order to improve their properties. Those which may be considered here, amongst others, are stabilisers (e.g. UV, thermal and gamma ray stabilisers), antistatic agents, flow promoters, demoulding agents, flame retardants, pigments, finely divided minerals and fibrous materials, e.g. alkyl and aryl phosphites, phosphates or phosphanes, low molecular weight carboxylic acid esters, halogen compounds, salts, chalk, quartz powder, and glass and carbon fibres.

Moreover, other polymers, e.g. polyolefines, polyurethanes or polystyrenes, may also be admixed with the polycarbonates according to the invention.

These substances are preferably added to the final polycarbonate in conventional installations, but they may also be added during the course of the process according to the invention, depending on the requirements.

In addition, it is also possible for the polycarbonates which are obtainable according to the invention to be modified for special applications by the condensing-in of blocks, segments and comonomers, e.g. siloxane blocks containing terminal phenolic OH groups, aromatic and aliphatic polyesters containing terminal phenolic OH and carboxylic acid groups, polyphenylene sulphide blocks containing terminal phenolic OH groups, or polyphenylene oxide blocks containing terminal phenolic OH groups.

The polycarbonates produced according to the invention are suitable for the usual areas of application, namely for electrical purposes, in the building industry and in the construction of motor vehicles, and thus for example as a support material for data storage devices, for bridging panels for covering purposes or as a casing material for electronic devices.

BRIEF DESCRIPTION OF THE PATENT DRAWING

FIG. 1 is a diagrammatic view of apparatus for producing thermoplastic polycarbonate, according to the present invention.

EXAMPLES

Example 1

The reaction mixture, comprising 25.18 g/hour bisphenol A (100 mole %) and 24.82 g/hour diphenyl carbonate (105 mole %), was melted in a supply vessel (1) heated by means of an oil-filled jacket. The molten educt mixture was then passed at 196° C./80 mbar through a column (2) packed with 180 g of Baylith TE 144 (heated to 196° C. by means of an oil-filled jacket). The column height was 46 cm, and the column diameter was 30 mm. In the course of this procedure, phenol was distilled off (3) and the oligocarbonate, which had a relatively low solution viscosity in the range from 1.028 to 1.037 (dichloromethane; 25° C.) - this range of variation was determined over the course of one hour—was collected (4). See FIG. 1.

The oligocarbonate obtained from the apparatus shown in FIG. 1 was transferred to a stirred flask fitted with a distillation column, the vacuum was intensified stepwise down to 1 mbar and the temperature was increased to 260° C. A light-coloured, solvent-free oligocarbonate was then obtained, with a relative solution viscosity of 1.157 (dichloromethane, 25° C., 5 g/l). NaOH ($5 \times 10^{-4}$ mole % with respect to bisphenol A) was then added as a 1% aqueous solution to the oligocarbonate and the oligocarbonate was stirred for 1.5 hours at 280° C. and 0.1 mbar. A light-coloured, solvent-free polycarbonate was obtained, which had a relative solution viscosity of 1.305 (dichloromethane, 25° C., 5 g/l). The phenolic OH content of the polycarbonate was 220 ppm.

Example 2

The procedure was as in Example 1, except that instead of Baylith TE 144 type zeolite the column was packed with the same amount of Baylith SV 133. An oligocarbonate was then collected which had a relative solution viscosity in the range from 1.028 to 1.033 (dichloromethane, 25° C.), and the light-coloured, solvent-free polycarbonate obtained had a relative solution viscosity of 1.298 (dichloromethane, 25° C., 5 g/l) and a phenolic OH content of 310 ppm.

Example 3

The procedure was as in Example 1, except that instead of Baylith TE 144 type zeolite the column was packed with the same amount of polybenzimidazole. An oligocarbonate was then obtained which had a relative solution viscosity in the range from 1.025 to 1.031 (dichloromethane, 25° C.), and the light-coloured, solvent-free polycarbonate obtained had a relative solution viscosity of 1.258 (dichloromethane, 25° C., 5 g/l) and a phenolic OH content of 380 ppm.

Example 4

The procedure was as in Example 1, except that the addition of the alkali metal catalyst was omitted. The light-coloured, solvent-free polycarbonate obtained had a relative solution viscosity of 1.228 (dichloromethane, 25° C., 5 g/l) and a phenolic OH content of 420 ppm.

Example 5

The procedure was as in Example 1, except that the column was operated at a temperature of 210° C. and at a pressure of 60 mbar. An oligocarbonate was then obtained which had a relative solution viscosity in the range from 1.035 to 1.042 (dichloromethane, 25° C.), and the light-coloured, solvent-free polycarbonate obtained had a relative solution viscosity of 1.310 (dichloromethane, 25° C., 5 g/l) and a phenolic OH content of 230 ppm.

We claim:

1. A transesterification process for producing thermoplastic polycarbonate, starting from diphenols, carboxylic acid diaryl esters and optionally branching agents and/or monophenols, with the use of catalysts at temperatures between 80° C. and 400° C. and pressures of 1000 mbar to 0.01 mbar, and wherein fixed bed catalysts are used as catalysts in concentrations from $10^{-8}$% by weight to 95% by weight, with respect to the diphenol used.

2. A process according to claim 1, characterised in that aluminosilicates are used as the fixed bed catalysts.

3. A process according to claim 1, characterised in that polybenzimidazoles are used as the fixed bed catalysts.

4. A process according to claim 1, characterised in that the transesterification is continuous by overflow over the fixed bed catalyst.

5. A transesterification process for producing thermoplastic polycarbonate, starting from diphenols, carboxylic acid diaryl esters and optionally branching agents and/or monophenols, with the use of catalysts at temperatures between 80° C. and 400° C. and pressures of 1000 mbar to 0.01 mbar, and wherein fixed bed catalysts are used as catalysts and an alkali metal/alkaline earth metal catalyst is used in addition.

6. A transesterification process for producing thermoplastic oligocarbonate, starting from diphenols, carboxylic acid diaryl esters and optionally branching agents and/or monophenols, with the use of catalysts at temperatures between 80° C. and 290° C. and pressures of 1000 mbar to 0.5 mbar, characterised in that fixed bed catalysts are used as catalysts.

7. A process according to claim 5, characterised in that the transesterification is effected in two steps, wherein in the first step the fixed bed catalysts are used for producing oligocarbonate, and the second step, the condensation polymerisation step, is effected with the addition of alkali metal/alkaline earth catalysts.

* * * * *

UNITED STATES PATENT AND TRADEMARK OFFICE
CERTIFICATE OF CORRECTION

PATENT NO. : 5,756,641
DATED : May 26, 1998
INVENTOR(S) : Steffen Kühling, et al It is certified that error appears in the above-indentified patent and that said Letters Patent is hereby corrected as shown below:

Column 1, line 44, "dipbenols" should read -- diphenols --; and

Column 3, line 34, "$Ca^+$" should read -- $Ca^{2+}$ --.

Signed and Sealed this

Eighteenth Day of August, 1998

Attest:

BRUCE LEHMAN

*Attesting Officer*     *Commissioner of Patents and Trademarks*